US012321755B2

(12) United States Patent
Sayyed et al.

(10) Patent No.: US 12,321,755 B2
(45) Date of Patent: Jun. 3, 2025

(54) SYSTEMS AND METHODS PROVIDING SEAMLESS ACCESSIBILITY ACROSS PRE-BOOT AND RUNTIME ENVIRONMENTS

(71) Applicant: Dell Products L.P., Round Rock, TX (US)

(72) Inventors: Ibrahim Sayyed, Georgetown, TX (US); Jagadish Babu Jonnada, Leander, TX (US); Phanindra Talasila, Austin, TX (US); Laxmi Lavanya Medicherla, Georgetown, TX (US); Anand Prakash Joshi, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 282 days.

(21) Appl. No.: 18/191,705

(22) Filed: Mar. 28, 2023

(65) Prior Publication Data
US 2024/0330005 A1  Oct. 3, 2024

(51) Int. Cl.
*G06F 9/4401*  (2018.01)
(52) U.S. Cl.
CPC .................. *G06F 9/4403* (2013.01)
(58) Field of Classification Search
CPC ..... G06F 9/4403; G06F 9/4401; G06F 21/572
See application file for complete search history.

(56) References Cited

U.S. PATENT DOCUMENTS

| 2020/0250017 | A1* | 8/2020 | Samuel | G06F 9/542 |
| 2020/0251074 | A1* | 8/2020 | Suryanarayana | G06F 3/04845 |
| 2021/0117003 | A1* | 4/2021 | Deisher | G06N 3/04 |

* cited by examiner

*Primary Examiner* — Jaweed A Abbaszadeh
*Assistant Examiner* — Gayathri Sampath
(74) *Attorney, Agent, or Firm* — Jackson Walker L.L.P.

(57) ABSTRACT

An operating system (OS) software service detects an accessibility change event and takes a snapshot of the accessibility settings before sending and receiving memory-mapped input/output (MMIO) commands with an embedded controller (EC) to establish trust using existing security hardening methods. The software service may send an MMIO command that includes the profile as a payload to the EC. The EC extracts the profile payload and saves it to an NVRAM variable before signaling a basic input/output system (BIOS) during early boot of an available accessibility profile. The EC publishes an accessibility profile presence to a BIOS pre-EFI initialization (PEI) layer, which sends a command to the EC to return the response. The BIOS creates a new hand off block (HOB) command indicative of the accessibility profile and passes this to an early Driver Execution Environment (DXE) stage, which reads the HOB data and locates the accessibility layer within a serial peripheral interface (SPI) firmware volume and loads into memory. This extracted profile information is passed onto the accessibility layer, which applies the profile data to user interface (UI) control attributes.

16 Claims, 6 Drawing Sheets

400

```
UI control attributes {
Suppress,
Deactivate,
PositionAndDimension,
Accessibility_Attribute {
    HighContrastBackgroundColor,
    HighContrastForegroundColor,
    Text2Speech support,
    Magnifier
    }
}
```

SYSTEMS AND METHODS PROVIDING SEAMLESS ACCESSIBILITY ACROSS PRE-BOOT AND RUNTIME ENVIRONMENTS

TECHNICAL FIELD

The present disclosure pertains to information handling systems and, more specifically, information handling system accessibility and user experience.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

People living with disabilities face a high level of difficulty for many everyday tasks and processes because, in many cases, accessibility was not taken into consideration when the task or process was designed. An illustrative and pervasive example of this issue is the absence of accessibility design consideration apparent in pre-operating system (pre-OS) user interfaces including, but not limited to, basic input/output system (BIOS) configuration screens that will be familiar to even casual end users. In the case of visually impaired users, for example, conventional BIOS configuration screens and other pre-OS user interfaces lack screen readers or analogous or alternative visually-tolerant features that consider and address the specific challenges associated with common visual impairments.

SUMMARY

Anecdotal evidence suggests that 2-5% of information handling system users worldwide operate laptop, notebook, desktop, tablet, and other types of systems via an accessibility mode. These users are no less deserving of a consistent accessibility experience across all operating environments than their fully-enabled colleagues. Users of all abilities need access to pre-OS interfaces and pre-OS methods and flows for serviceability such as to perform diagnostics, remote flash updates, and perform repair and recovery tasks. The absence of pre-OS accessibility features makes it needlessly more difficult for impaired users to follow OEM-guided solutions within preboot screens.

Methods and systems disclosed herein extend accessibility features available in a runtime operating environment to encompass the pre-OS environment. Disclosed features may capture a runtime accessibility profile or configuration and replicate the profile or configuration in one or more pre-OS environments. In this manner, disclosed features enable a user experience that is consistent and seamless across two or more heterogeneous operating environments including, for example, an OS operating environment and a BIOS operating environment.

The information handling system may be a desktop, laptop, notebook, or tablet device that includes an embedded controller (EC). In at least some such embodiments, the EC may be employed to provide a runtime firmware service for tracking accessibility preference and/or accessibility configuration settings of the host OS. EC may invoke communication with the OS via a software service running in a user context with administrative privileges.

Accessibility may encompass various features including, as illustrative examples, high contrast display features, magnifier and narrator support, via icons embedded in a user interface (UI) screen, for screen readability and voice assist prompts, respectively.

The absence of accessibility features within Unified Extensible Firmware Interface (UEFI) Basic Input/Output System (BIOS) compliant firmware across the industry is noteworthy and it is important to extend accessibility support for a variety of reasons. For example, a user cannot perform hardware configuration updates without accessing the BIOS setup UI. Similarly, access to UEFI BIOS connectivity, which is extremely important for system recovery and update when a system experiences a no Host operating system (OS) boot situation and needs to update BIOS remotely or pull a recovery image from the cloud, requires a user to enter network credentials and follow a UI guided approach on the screen. In addition, preboot authentication methods for securing platforms from in-person intrusion attacks, e.g., Bitlocker, need to provide seamless user experience consistent across OS and BIOS authentication application UI.

Issues noted above are addressed by disclosed subject matter in which a platform's EC interacts with BIOS and OS resources to extend OS runtime accessibility presences and configurations to pre-OS environments including BIOS UIs.

An OS software service running in the background tracks whether any accessibility change event has occurred. If any such events have occurred, a handler is executed to take a snapshot of the user-configured accessibility settings and store the settings in a profile along with a checksum (e.g., SHA2) for data integrity. The software service may then perform a handshake with the EC by sending and receiving EC memory-mapped input/output (MMIO) commands and establish trust using existing security hardening methods. After establishing a connection with the EC, the software service may send a special command (Accessibility_MMIO_Cmd), which includes the profile as payload to the EC.

The EC validates the Accessibility_MMIO_Cmd and extracts the profile payload from it. The EC may then create a new EC-managed non-volatile random-access memory (NVRAM) store to save it. EC signals to BIOS through a memory controller command during early stage of boot process that the Accessibility profile is available. The EC may return the profile data upon receiving a command from BIOS for further processing.

The EC publishes an accessibility profile presence to the BIOS pre-EFI initialization (PEI) layer, which sends a command to the EC to return the response. BIOS checks the sanity of the profile and creates a new hand off block (HOB) command by saving the profile to a buffer. BIOS passes the HOB to an early Driver Execution Environment (DXE) stage, which reads the HOB data, locates the an serial peripheral interface (SPI) firmware volume containing the accessibility layer, and loads the accessibility layer into memory. The extracted profile information is passed on to the accessibility layer.

A UEFI driver may publish dedicated protocols and copy the profile information into protocol attributes. An accessibility layer applies profile data to UI control attributes. When a user Invokes F2 BIOS setup/F12 boot menu that is configured with default non-accessibility mode, all UI screen controls are adapted to the accessibility layer provided profile attributes such as Text color and Page background color.

In one aspect, disclosed systems and methods provision an embedded controller or other suitable resource to monitor a software service operating in a host OS environment for an accessibility change event indicative of a change in an accessibility attribute including, as an example, a high contrast attribute. Upon detecting an accessibility change event, an accessibility profile, indicative of the accessibility settings, is accessed and store in a nonvolatile store. During a subsequent pre-boot sequence, BIOS is signaled to indicate that the accessibility profile is available. Responsive to a BIOS request for the accessibility profile, the profile is provided to the BIOS to cause the BIOS to apply accessibility attributes indicated in the profile to BIOS UIs and other BIOS-generated content for the user.

Methods and systems may establish a trusted connection between the EC and the software service by performing a handshaking via at least one MMIO command including a payload containing the accessibility profile. The checksum associated with the profile may be evaluated to confirm integrity of the profile.

The BIOS may obtain the accessibility profile during a PEI phase, create an HOB indicative of the profile, and forward the HOB to a DXE phase. The DXE phase may read the HOB, locate a firmware volume including an accessibility layer, load the accessibility layer to memory, and pass the profile to the accessibility layer.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
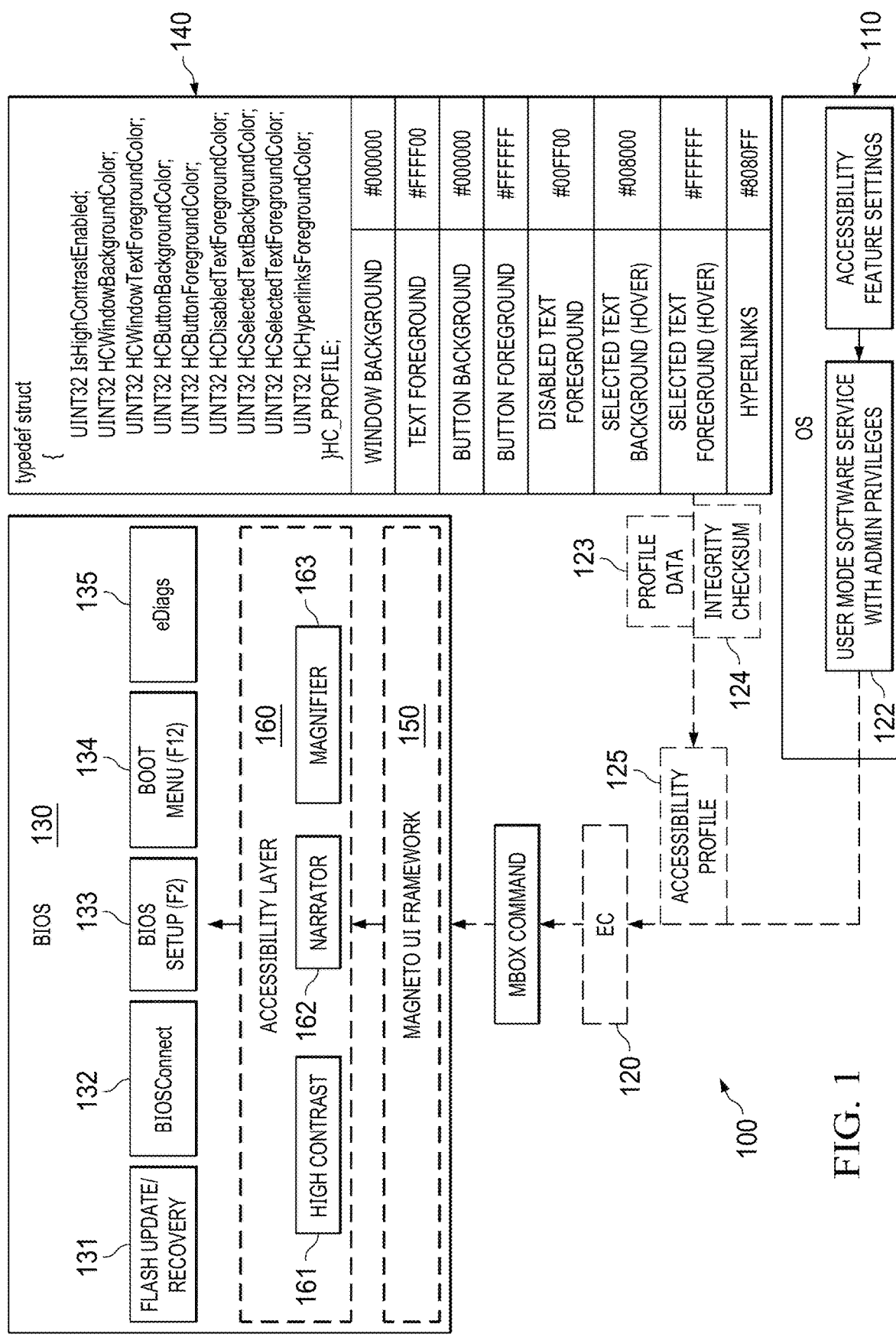
FIG. 1 illustrates exemplary information handling system resources for extending runtime accessibility features to a pre-OS environment.

Exemplary embodiments and their advantages are best understood by reference to FIGS. 1-6, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic.

Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 depicts an information handling system 100 with emphasis on accessibility features and, more specifically, features for extending runtime accessibility features to pre-OS operating environment. The information handling system 100 illustrated in FIG. 1 includes an EC 120 in communication with both an os space, referred to herein simply as OS 110, and a BIOS space, referred to herein simply as BIOS 130. The illustrated EC 120 orchestrates the extension of accessibility features enabled in OS 110 to encompass BIOS 130. To illustrate using an example of a visually impaired user, if the user configures and enables a high contrast feature from within OS 110, the high contrast feature will be automatically enabled should the user subsequently cause the system to transition to a pre-OS operating state. The BIOS 130 illustrated in FIG. 1 depicts various pre-OS resources that the user may, at some point in time, need to access. The pre-OS resources depicted in FIG. 1 include a Flash update/recovery resource 131, a BIOSconnect resource 132 for establishing a pre-OS network connection, a BIOS setup resource 133, a Boot Menu resource 134, and an eDiag resource 135. Those of ordinary skill in the field will appreciate that the illustrated resources are exemplary and that other implementations may support more, fewer, and/or different pre-OS resources. The illustrated BIOS 130 incudes a UI framework 150 and an accessibility layer 160 for generating accessibility-aware UIs. FIG. 1 depicts example accessibility settings supported by accessibility layer 160, including high contrast 161, narrator 162, and magnifier 163.

The illustrated OS 110 may, in at least some embodiments, support a software service 122, running in a user mode with administrative privileges, for retrieving an accessibility profile 125 containing information indicative of the platform's currently enabled accessibility preferences and/or configurations. The accessibility profile 125 may include profile data 123, exemplified by the high contrast profile data structure 140 depicted in FIG. 1, and an optional integrity checksum 124.

Figure 2A:
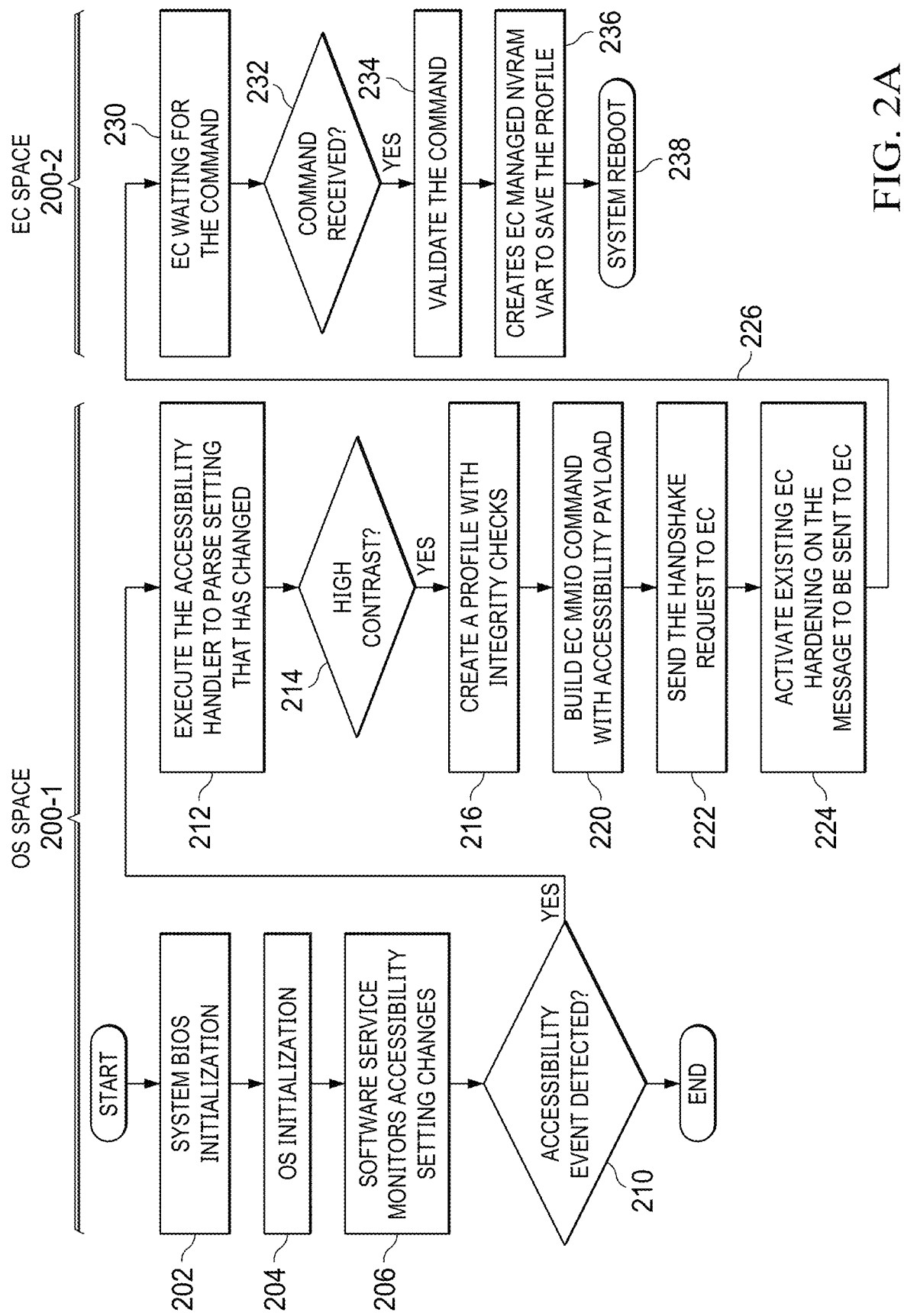
FIG. 2 illustrates flow diagrams depicting accessibility operations performed by an operating system, embedded controller and BIOS to achieve seamless extension of accessibility attributes to multiple operating environments.
Figures 2, 2B:
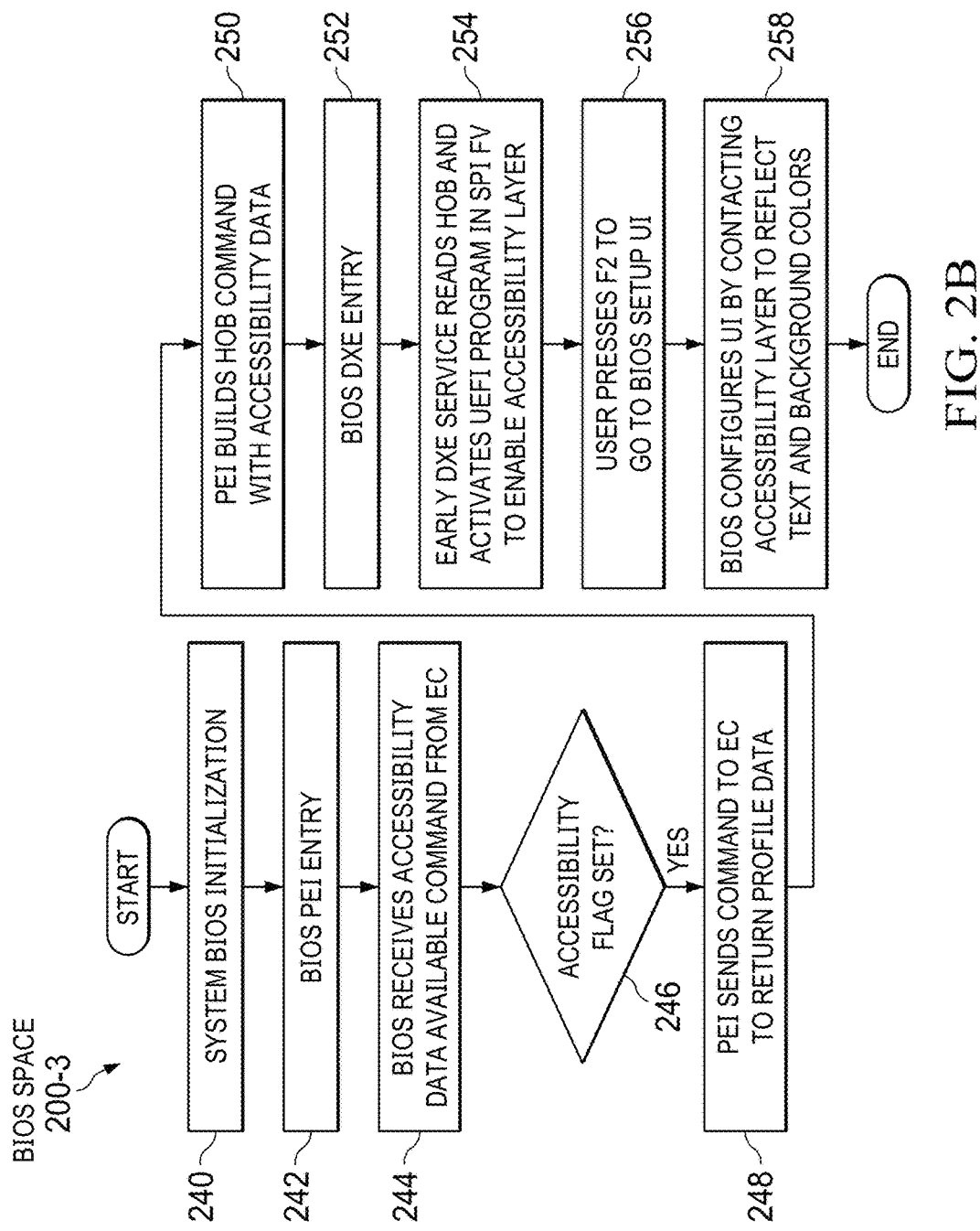

Turning now to FIG. 2, exemplary flow diagrams 200-1 to 200-3 illustrate operations performed by OS 110, EC 120, and BIOS 130 respectively to implement seamless accessibility profiles across heterogeneous operating environments. The operations of OS 110 begin by initializing (202) system BIOS and initializing (204) the OS. Following BIOS and OS initializations, the previously referenced software service monitors (206) accessibility setting changes and upon detecting (210) an accessibility change event, invokes (212) an accessibility handler to parse any one or more settings that have changed. For this example, in which the accessibility feature of interest is the high contrast feature, the illustrated method confirms (214) and for the high contrast feature in particular, the illustrated method determines or confirms that the changed setting is a high contrast setting and creates (216) a profile with an integrity checksum. The service then builds (220) an EC MMIO command with accessibility payload and sends (222) a handshake request to EC 120. The service then activates (224) existing EC hardening on the message to be sent to the EC and sends the message to EC 120 by way of the MMIO interface 226. The use of MMIO for OS-EC communications beneficially avoids time consuming context switches that are typical of interrupt-based communication.

EC 120, which has been waiting (230) for a command detects (232) a received command. EC 120 then validates (234) the command before creating (236) an EC managed NVRAM variable to save the profile. EC 120 then initiates a system reboot (238).

After an initialization step (240), BIOS enters PEI phase (242), within which BIOS 130 receives (244) a command from EC 120 indicating data availability. BIOS 130 then determines (246) whether an accessibility flag is set and, if so, sends (248) a command returning the profile data to EC 120. BIOS 130 then builds (250) an HOB command to activate accessibility settings before entering (252) the DXE phase. An early DXE service receives (254) the HOB and enables an accessibility layer by locating a firmware volume, e.g., audio/video, with accessibility features. If the user invokes (256), for example, a BIOS set up menu by pressing an appropriate function key such as the F2 key, BIOS 130 contacts the accessibility layer to configure (258) the corresponding UI screen in accordance with the applicable accessibility settings, e.g., text and background colors.

Figure 3:
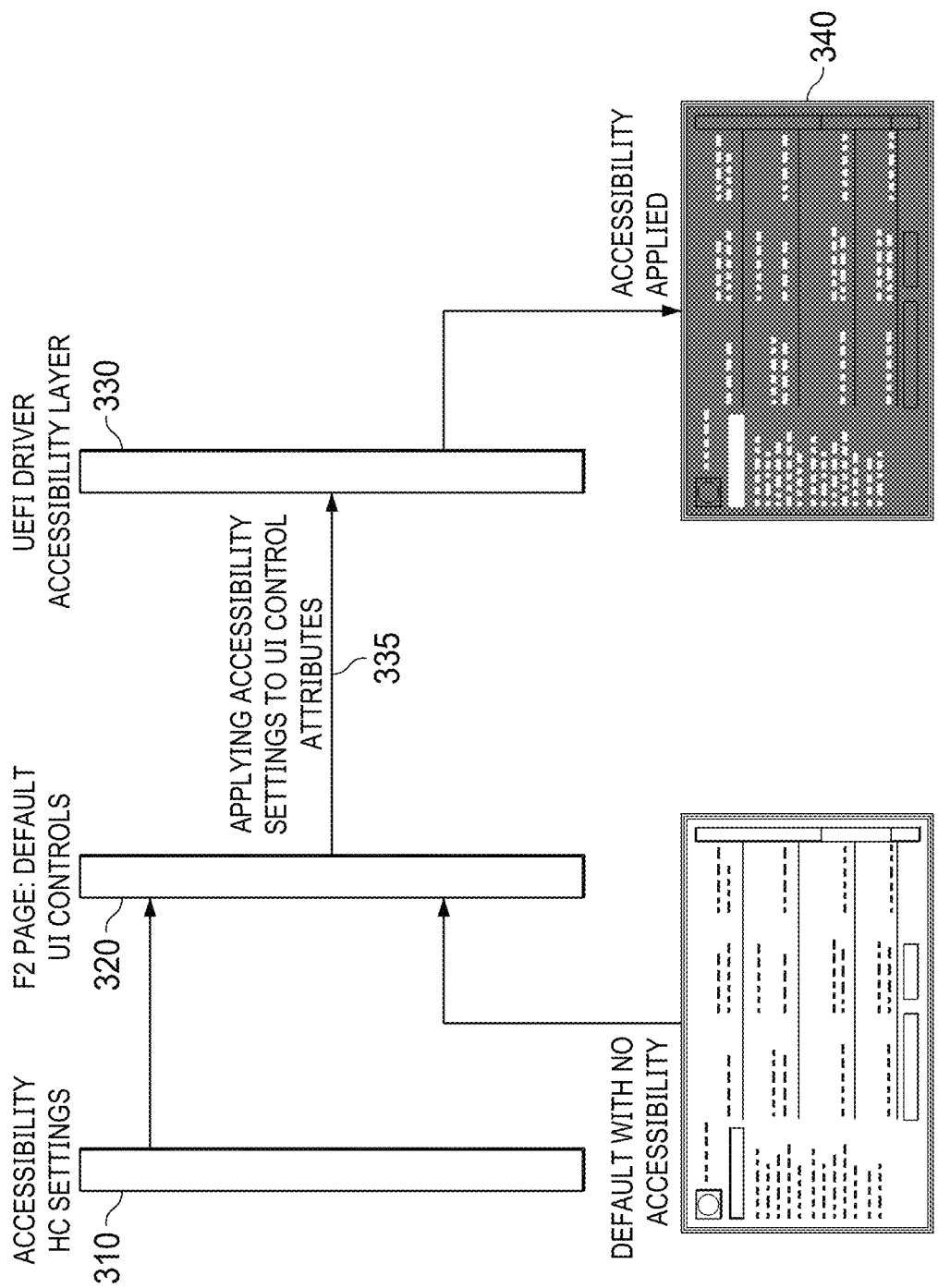
FIG. 3 illustrates aspects of implementing high contrast accessibility features in BIOS.

FIG. 3 illustrates an example of an OS-space accessibility setting applied to a pre-OS user interface for a high contrast accessibility feature and a BIOS setup UI. The default UI controls, such as the UI control 400 depicted in FIG. 4, for each BIOS UI include accessibility placeholders for each UI attribute that supports an accessibility configuration. As depicted in FIG. 3, a UEFI driver applies (335) high contrast settings 310 to the default UI control 320 for the BIOS setup or "F2" UI to produce an accessibility layer 330 and apply the accessibility layer 330 to render a pre-OS, accessibility-enabled UI 340.

Figures 4, 5:
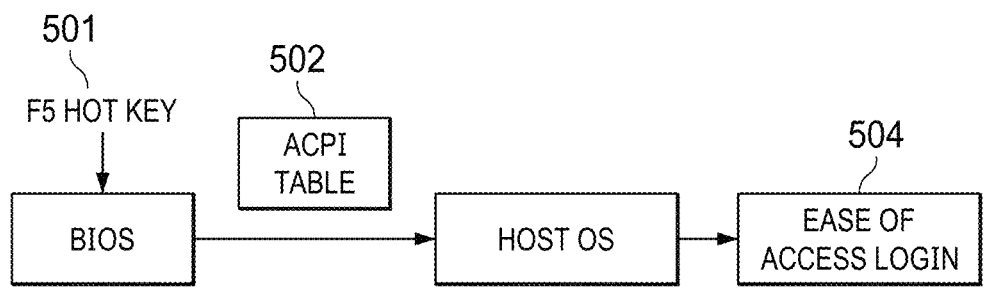
FIG. 4 illustrates an exemplary UI control suitable for use in the example of FIG. 3.
FIG. 5 depicts aspects of a hot key feature for booting BIOS to an accessibility mode.

Referring now to FIG. 5, BIOS 130 may reserve a hot key (501), e.g., F5, to instrument the BIOS to boot to an accessibility boot mode. This method may be suitable when BIOS 130 has created a dedicated page with a particular accessibility configuration. The user may select the applicable accessibility settings, e.g., high contrast, narrator, and/or magnifier settings, and the selected settings are applied for use within BIOS 130. At a ReadyToBoot callback ( ) UEFI creates a new Advanced Configuration and Power Interface (ACPI) table 502, e.g., UEFI Accessibility_table containing BIOS-configured accessibility profiles such as HC (High contrast color theme). These profiles may be presented while the system is booting to OS. In at least some cases, an early OS startup program reads the BIOS presented ACPI table and configures 'ease of access' log-on screens 504 directly.

Figure 6:
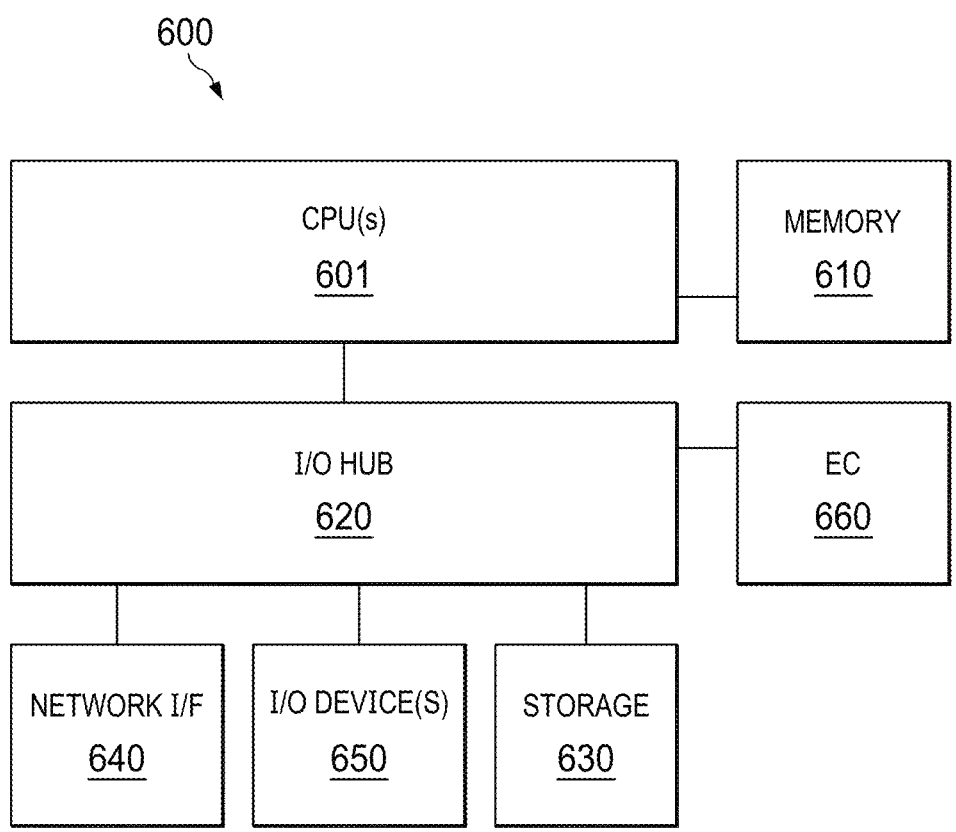
FIG. 6 illustrates an exemplary information handling system for use in conjunction with subject matter depicted in FIGS. 1-5 and described in the accompanying text.

Referring now to FIG. 6, any one or more of the elements illustrated in FIG. 1 through FIG. 5 may be implemented as or within an information handling system exemplified by the information handling system 600 illustrated in FIG. 6. The illustrated information handling system includes one or more general purpose processors or central processing units (CPUs) 601 communicatively coupled to a memory resource 610 and to an input/output hub 620 to which various I/O resources and/or components are communicatively coupled. The I/O resources explicitly depicted in FIG. 6 include a network interface 640, commonly referred to as a NIC (network interface card), storage resources 630, and additional I/O devices, components, or resources 650 including as non-limiting examples, keyboards, mice, displays, printers, speakers, microphones, etc. The illustrated information handling system 600 includes an embedded controller EC 660 that may provide or support various system management functions and, in at least some implementations, keyboard controller functions. Exemplary system management functions that may be supported by EC 660 include thermal management functions supported by pulse width modulation (PWM) interfaces suitable for controlling system fans, power monitoring functions supported by an analog-to-digital (ADC) signal that can be used to monitor voltages and, in conjunction with sense resistor, and current consumption per power rail. This information could be used to, among other things, monitor battery charging or inform the user or administrator of potentially problematic power supply conditions. EC 660 may support battery management features to control charging of the battery in addition to switching between the battery and AC adapter as the active power source changes or monitoring the various battery status metrics such as temperature, charge level and overall health. EC 660 may support an ACPI compliant OS by providing status and notifications regarding power management events and by generating wake events to bring the system out of low power states.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method, comprising:
   monitoring a software service operating in a host operating system (OS) environment for an accessibility change event indicative of a change in an accessibility attribute;
   responsive to detecting the accessibility change event, accessing and storing an accessibility profile indicative of the accessibility attribute;
   during a subsequent pre-boot sequence, signaling a basic input/output system (BIOS) of the information handling system to indicate the accessibility profile is available; and
   responsive to a BIOS request for the accessibility profile, providing the accessibility profile to the BIOS to cause the BIOS to apply the accessibility attribute indicated in the accessibility profile to BIOS-generated content for a user.

2. The method of claim 1, wherein the monitoring comprises monitoring by an embedded controller (EC) of the information handling system.

3. The method of claim 2, further comprising establishing a trusted connection between the EC and the software service.

4. The method of claim 3, wherein establishing the trusted connection includes performing a handshaking with the software service via a memory mapped input/output (I/O) command including a payload containing the accessibility profile.

5. The method of claim 1, further comprising evaluating a checksum included with the accessibility profile to confirm integrity of the accessibility profile.

6. The method of claim 1, wherein the BIOS obtains the accessibility profile during a pre-EFI initialization (PEI) phase, creates a handoff block (HOB) indicative of the accessibility profile, and forwards the HOB to a Driver Execution Environment (DXE) phase.

7. The method of claim 6, wherein the DXE phase reads the HOB, locates a firmware volume including an accessibility layer, and loads the accessibility layer to memory.

8. The method of claim 7, further comprising passing the accessibility profile to the accessibility layer.

9. An information handling system, comprising:
   a central processing unit (CPU);
   an embedded controller (EC), communicatively coupled to the CPU; and
   a system memory including processor executable instructions that, when executed by the CPU, cause the system to perform operations comprising:
   monitoring a software service operating in a host operating system (OS) environment for an accessibility change event indicative of a change in an accessibility attribute;
   responsive to detecting the accessibility change event, accessing and storing an accessibility profile indicative of the accessibility attribute;
   during a subsequent pre-boot sequence, signaling a basic input/output system (BIOS) of the information handling system to indicate the accessibility profile is available; and
   responsive to a BIOS request for the accessibility profile, providing the accessibility profile to the BIOS to cause the BIOS to apply the accessibility attribute indicated in the accessibility profile to BIOS-generated content for the user.

10. The information handling system of claim 9, wherein the monitoring comprises monitoring by the EC of the information handling system.

11. The information handling system of claim 10, further comprising establishing a trusted connection between the EC and the software service.

12. The information handling system of claim 11, wherein establishing the trusted connection includes, performing a handshake with the software service via a memory mapped input/output (I/O) command including a payload containing the accessibility profile.

13. The information handling system of claim 9, further comprising evaluating a checksum included with the accessibility profile to confirm integrity of the accessibility profile.

14. The information handling system of claim 9, wherein the BIOS obtains the accessibility profile during a PEI phase, creates a handoff block (HOB) indicative of the accessibility profile, and forwards the HOB to a Driver Execution Environment (DXE) phase.

15. The information handling system of claim 14, wherein the DXE phase reads the HOB, locates a firmware volume including an accessibility layer, and loads the accessibility layer to memory.

16. The information handling system of claim 15, further comprising passing the accessibility profile to the accessibility layer.

\* \* \* \* \*